US010972488B2

(12) United States Patent
Pal et al.

(10) Patent No.: US 10,972,488 B2
(45) Date of Patent: *Apr. 6, 2021

(54) METHOD AND SYSTEM FOR MODELING ALL OPERATIONS AND EXECUTIONS OF AN ATTACK AND MALICIOUS PROCESS ENTRY

(71) Applicant: CHECK POINT SOFTWARE TECHNOLOGIES LTD., Tel Aviv (IL)

(72) Inventors: Anandabrata Pal, Rehovot (IL); Lior Arzi, Givatayim (IL); Tamara Leiderfarb, Modiin (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,118

(22) Filed: Sep. 15, 2019

(65) Prior Publication Data

US 2020/0084230 A1 Mar. 12, 2020

Related U.S. Application Data

(63) Continuation of application No. 14/963,267, filed on Dec. 9, 2015, now Pat. No. 10,440,036.

(51) Int. Cl.
*H04L 29/06* (2006.01)

(52) U.S. Cl.
CPC ...... *H04L 63/1416* (2013.01); *H04L 63/1433* (2013.01); *H04L 63/1441* (2013.01)

(58) Field of Classification Search
CPC .......... H04L 63/1416; H04L 63/145; H04L 63/1441; H04L 63/1408; H04L 63/1425; H04L 63/1433; H04L 63/14; G06F 21/566; G06F 2201/865; G06F 21/56; G06F 9/4843; G06F 21/577; G06F 21/554; G06F 21/55; G06F 21/552; G06F 21/51; G06F 21/562; G06F 2221/033; G06F 11/3003; G06F 21/53; G06F 16/16; G06F 2221/034; G06F 21/567
See application file for complete search history.

(56) References Cited

U.S. PATENT DOCUMENTS 5,850,516 A * 12/1998 Schneier ............... G06F 21/57
726/25
6,886,102 B1 * 4/2005 Lyle ..................... G06F 21/554
709/206

(Continued)

OTHER PUBLICATIONS

Shandilya et al., Use of Attack Graphs in Security Systems, Journal of Computer Networks and Communications, Oct. 2014.

(Continued)

*Primary Examiner* — David Garcia Cervetti
(74) *Attorney, Agent, or Firm* — Mark M. Friedman

(57) ABSTRACT

Computerized methods and systems determine an entry point or source of an attack on an endpoint, such as a machine, e.g., a computer, node of a network, system or the like. These computerized methods and systems utilize an attack execution/attack or start root, to build an attack tree, which shows the attack on the end point and the damage caused by the attack, as it propagates through the machine, network, system, or the like.

20 Claims, 8 Drawing Sheets

(56) References Cited

U.S. PATENT DOCUMENTS

| | | | | |
|---|---|---|---|---|
| 6,971,028 B1* | 11/2005 | Lyle | | G06F 21/554 709/224 |
| 7,072,876 B1* | 7/2006 | Michael | | G06N 20/00 706/45 |
| 7,085,936 B1* | 8/2006 | Moran | | G06F 21/552 726/5 |
| 7,200,105 B1* | 4/2007 | Milliken | | H04L 63/1416 370/216 |
| 7,293,281 B1 | 11/2007 | Moran et al. | | |
| 7,530,104 B1* | 5/2009 | Thrower | | G06F 21/554 713/188 |
| 7,814,546 B1* | 10/2010 | Strayer | | H04L 63/1416 726/23 |
| 7,870,610 B1* | 1/2011 | Mitchell | | G06F 21/53 726/23 |
| 7,958,560 B1* | 6/2011 | Guruswamy | | G06F 21/566 726/25 |
| 7,971,252 B2* | 6/2011 | Lippmann | | H04L 63/20 707/999.1 |
| 8,464,346 B2* | 6/2013 | Barai | | H04L 63/1433 726/25 |
| 8,474,043 B2 | 6/2013 | Sturges et al. | | |
| 8,547,974 B1* | 10/2013 | Guruswamy | | H04L 43/026 370/389 |
| 8,601,587 B1* | 12/2013 | Powell | | G06F 21/552 726/25 |
| 8,813,234 B1* | 8/2014 | Bowers | | H04L 63/20 726/25 |
| 8,881,282 B1* | 11/2014 | Aziz | | G06F 21/00 726/24 |
| 9,092,625 B1* | 7/2015 | Kashyap | | G06F 21/566 |
| 9,098,333 B1* | 8/2015 | Obrecht | | G06F 11/3442 |
| 9,124,622 B1* | 9/2015 | Falkowitz | | H04L 67/02 |
| 9,177,153 B1 | 11/2015 | Khosla et al. | | |
| 9,203,862 B1* | 12/2015 | Kashyap | | H04L 63/145 |
| 9,292,688 B2* | 3/2016 | Avasarala | | G06F 21/56 |
| 9,292,695 B1* | 3/2016 | Bassett | | G06F 21/577 |
| 9,330,259 B2* | 5/2016 | Klein | | G06F 21/54 |
| 9,344,444 B2* | 5/2016 | Lippmann | | H04L 63/20 |
| 9,369,484 B1* | 6/2016 | Lacerte | | H04L 63/1416 |
| 9,378,367 B2* | 6/2016 | Pereira | | G06F 21/554 |
| 9,531,736 B1 | 12/2016 | Torres et al. | | |
| 9,537,884 B1* | 1/2017 | Raugas | | H04L 63/1433 |
| 9,843,596 B1 | 12/2017 | Averbuch et al. | | |
| 9,894,090 B2* | 2/2018 | Hebert | | G06F 16/2246 |
| 10,423,788 B2* | 9/2019 | Keromytis | | G06N 7/005 |
| 2002/0032717 A1* | 3/2002 | Malan | | H04L 43/00 718/105 |
| 2002/0157021 A1* | 10/2002 | Sorkin | | H04L 63/1441 726/4 |
| 2004/0093521 A1* | 5/2004 | Hamadeh | | H04L 69/161 726/22 |
| 2004/0172557 A1* | 9/2004 | Nakae | | H04L 63/0263 726/22 |
| 2005/0138413 A1* | 6/2005 | Lippmann | | G06F 21/577 726/4 |
| 2005/0257265 A1* | 11/2005 | Cook | | H04L 63/1441 726/23 |
| 2006/0021034 A1* | 1/2006 | Cook | | H04L 63/083 726/22 |
| 2006/0021044 A1* | 1/2006 | Cook | | H04L 63/1433 726/25 |
| 2006/0021045 A1* | 1/2006 | Cook | | H04L 63/1433 726/25 |
| 2006/0021046 A1* | 1/2006 | Cook | | H04L 63/1433 726/25 |
| 2006/0021047 A1* | 1/2006 | Cook | | H04L 63/1433 726/25 |
| 2006/0021048 A1* | 1/2006 | Cook | | G06F 21/577 726/25 |
| 2006/0021049 A1* | 1/2006 | Cook | | H04L 63/1433 726/25 |
| 2006/0021050 A1* | 1/2006 | Cook | | G06F 21/577 726/25 |
| 2006/0085858 A1* | 4/2006 | Noel | | H04L 63/1433 726/25 |
| 2006/0242406 A1* | 10/2006 | Barde | | G06F 21/10 713/164 |
| 2006/0248594 A1* | 11/2006 | Grigorovitch | | H04L 63/08 726/26 |
| 2006/0253906 A1* | 11/2006 | Rubin | | H04L 63/20 726/23 |
| 2007/0016955 A1* | 1/2007 | Goldberg | | G06Q 40/08 726/25 |
| 2007/0067843 A1* | 3/2007 | Williamson | | G06F 21/568 726/24 |
| 2007/0094735 A1* | 4/2007 | Cohen | | H04L 63/168 726/25 |
| 2007/0113281 A1* | 5/2007 | Leach | | G06Q 40/08 726/22 |
| 2007/0300300 A1* | 12/2007 | Guo | | G06F 21/552 726/23 |
| 2008/0002725 A1* | 1/2008 | Alicherry | | H04L 63/1458 370/401 |
| 2008/0005782 A1* | 1/2008 | Aziz | | H04L 63/1425 726/3 |
| 2008/0127292 A1* | 5/2008 | Cooper | | G06F 21/53 726/1 |
| 2008/0141371 A1* | 6/2008 | Bradicich | | G06F 21/552 726/23 |
| 2008/0222215 A1* | 9/2008 | Bai | | G06F 21/568 |
| 2008/0276317 A1* | 11/2008 | Chandola | | H04L 63/1425 726/23 |
| 2008/0281962 A1* | 11/2008 | Kai | | G06Q 10/06 709/224 |
| 2009/0044024 A1* | 2/2009 | Oberheide | | G06F 21/562 713/188 |
| 2009/0044277 A1 | 2/2009 | Aaron | | |
| 2009/0271863 A1* | 10/2009 | Govindavajhala | | H04L 63/1433 726/23 |
| 2010/0024036 A1* | 1/2010 | Morozov | | G06F 21/74 726/26 |
| 2010/0031358 A1 | 2/2010 | Elovici et al. | | |
| 2010/0058456 A1* | 3/2010 | Jajodia | | H04L 63/20 726/11 |
| 2010/0082513 A1 | 4/2010 | Liu | | |
| 2010/0212013 A1* | 8/2010 | Kim | | H04L 45/12 726/23 |
| 2010/0293615 A1* | 11/2010 | Ye | | G06F 21/566 726/22 |
| 2010/0333002 A1 | 12/2010 | Karabey et al. | | |
| 2011/0030045 A1* | 2/2011 | Beauregard | | G06F 9/468 726/9 |
| 2012/0166456 A1* | 6/2012 | Kim | | G06F 16/25 707/754 |
| 2012/0233699 A1* | 9/2012 | Jajodia | | G06F 21/577 726/25 |
| 2013/0042294 A1* | 2/2013 | Colvin | | H04L 63/145 726/1 |
| 2013/0160128 A1* | 6/2013 | Dolan-Gavitt | | G06F 21/566 726/25 |
| 2013/0167236 A1* | 6/2013 | Sick | | G06F 21/552 726/24 |
| 2013/0254494 A1* | 9/2013 | Oxford | | G06F 12/0837 711/145 |
| 2013/0318616 A1* | 11/2013 | Christodorescu | | H04L 63/1408 726/25 |
| 2013/0339930 A1* | 12/2013 | Xu | | G06F 11/3684 717/125 |
| 2013/0347111 A1* | 12/2013 | Karta | | H04L 63/1441 726/24 |
| 2014/0237590 A1* | 8/2014 | Shua | | G06F 21/566 726/22 |
| 2014/0289851 A1* | 9/2014 | Klein | | G06F 21/566 726/23 |
| 2015/0033346 A1* | 1/2015 | Hebert | | G06F 21/577 726/25 |

(56) References Cited

U.S. PATENT DOCUMENTS

| | | | |
|---|---|---|---|
| 2015/0047032 A1 | 2/2015 | Hannis et al. | |
| 2015/0082399 A1* | 3/2015 | Wu | H04L 9/0897 726/6 |
| 2015/0172302 A1* | 6/2015 | Conlon | H04L 63/1408 726/23 |
| 2015/0186786 A1* | 7/2015 | Goyal | H04L 63/0227 706/48 |
| 2015/0199512 A1* | 7/2015 | Kim | G06F 21/566 726/23 |
| 2015/0264062 A1* | 9/2015 | Hagiwara | G06F 21/567 726/24 |
| 2015/0269383 A1* | 9/2015 | Lang | H04L 63/20 726/1 |
| 2015/0278518 A1* | 10/2015 | Pereira | G06F 21/554 726/23 |
| 2015/0371043 A1* | 12/2015 | Bejerasco | G06F 21/51 726/22 |
| 2015/0373036 A1* | 12/2015 | Patne | G06F 21/755 726/23 |
| 2015/0381649 A1 | 12/2015 | Schultz et al. | |
| 2016/0044049 A1 | 2/2016 | Xing et al. | |
| 2016/0072844 A1* | 3/2016 | Porras | H04L 63/20 726/1 |
| 2016/0099963 A1* | 4/2016 | Mahaffey | G06F 21/554 726/25 |
| 2016/0105454 A1 | 4/2016 | Li et al. | |
| 2016/0162690 A1* | 6/2016 | Reith | G06F 21/577 726/25 |
| 2016/0173446 A1* | 6/2016 | Nantel | H04L 63/0209 726/11 |
| 2016/0188878 A1* | 6/2016 | Kulkarni | G06F 21/567 726/23 |
| 2016/0205122 A1* | 7/2016 | Bassett | G06F 21/577 726/23 |
| 2016/0239661 A1 | 8/2016 | Kawauchi | |
| 2016/0285894 A1* | 9/2016 | Nelms | H04L 63/1416 |
| 2016/0359711 A1* | 12/2016 | Deen | H04L 43/02 |
| 2016/0366167 A1* | 12/2016 | Yumer | H04L 63/1425 |
| 2016/0381043 A1* | 12/2016 | Yamada | H04L 63/1425 726/23 |
| 2017/0019421 A1* | 1/2017 | Hebert | H04L 63/1408 |
| 2017/0048266 A1* | 2/2017 | Hovor | H04L 63/14 |
| 2017/0076092 A1* | 3/2017 | Kashyap | G06F 21/552 |
| 2017/0093910 A1* | 3/2017 | Gukal | H04L 63/1425 |
| 2017/0109189 A1* | 4/2017 | Swidowski | G06F 9/45558 |
| 2017/0126741 A1* | 5/2017 | Lang | G06F 21/604 |
| 2017/0163666 A1* | 6/2017 | Venkatramani | H04L 63/0272 |
| 2017/0171225 A1* | 6/2017 | Pal | H04L 63/1416 |
| 2017/0171229 A1* | 6/2017 | Arzi | H04L 63/1408 |
| 2017/0171230 A1* | 6/2017 | Leiderfarb | H04L 63/145 |
| 2018/0234310 A1 | 8/2018 | Ingalls et al. | |

OTHER PUBLICATIONS

Angelini et al., PERCIVAL: Proactive and rEactive attack and Response assessment for Cyber Incidents using Visual Analytics, 2015, IEEE.

Buldas et al., New Efficient Utility Upper Bounds for the Fully Adaptive Model of Attack Trees, Springer, 2013.

Kotenko et al., A Cyber Attack Modeling and Impact Assessment Framework, 2013, NATO CCD COE Publications.

* cited by examiner

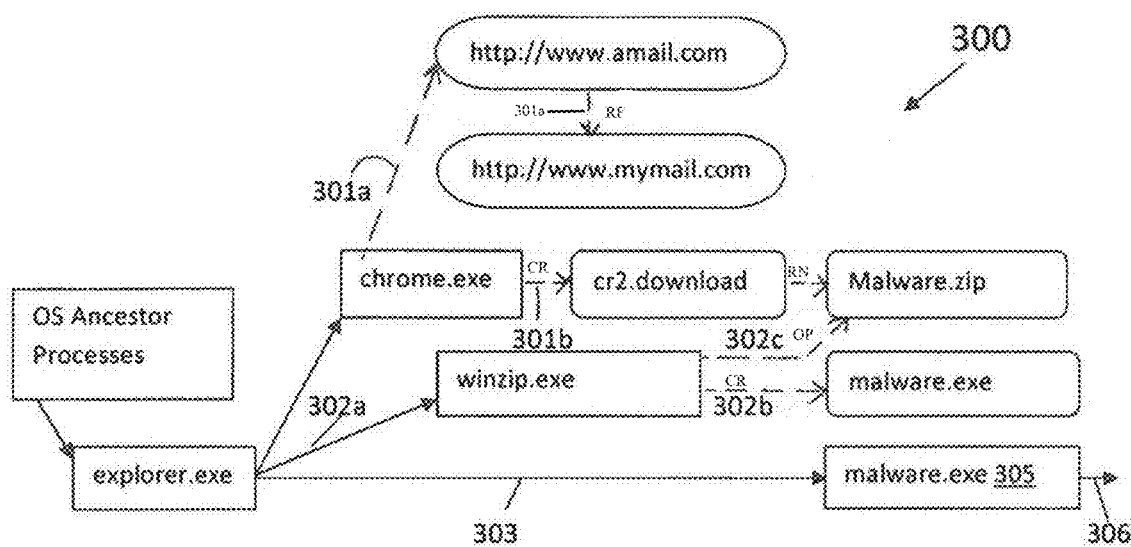
Legend
 Indicates a URL
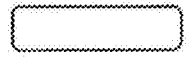 Indicates a File
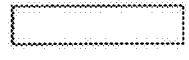 Indicates a Process
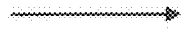  Indicates Execution
  Indicates Other (CR=create, RN=rename, OP=open, RF=referral, SN=sends)
FIG. 3B-1

METHOD AND SYSTEM FOR MODELING ALL OPERATIONS AND EXECUTIONS OF AN ATTACK AND MALICIOUS PROCESS ENTRY

CROSS REFERENCES TO RELATED APPLICATIONS

This application is a continuation application of commonly owned U.S. patent application Ser. No. 14/963,267, filed on Dec. 9, 2015, entitled: Method and System for Modeling All Operations and Executions of an Attack and Malicious Process Entry, now, U.S. Pat. No. 10,440,036, which is related to the following commonly owned US patent applications and US patents: 1) Method and System for Determining Initial Execution of an Attack U.S. patent application Ser. No. 14/963,265, filed on Dec. 9, 2015); 2) Method and System for Identifying Potentially Malicious Events During an Attack (U.S. patent application Ser. No. 15/292,169, filed on Oct. 13, 2016, now U.S. Pat. No. 10,462,160); 3) Method and System for Identifying Summary Attacks (U.S. patent application Ser. No. 15/372,423, filed on Dec. 8, 2016, now U.S. Pat. No. 10,291,634); and, 4) Method and System for Detecting and Remediating Polymorphic Attacks Across an Enterprise (U.S. patent application Ser. No. 15/373,482, filed on Dec. 9, 2016, now U.S. Pat. No. 10,193,906), all of the disclosures of the aforementioned patent applications and patents incorporated by reference in their entirety herein.

TECHNICAL FIELD

The present invention relates to methods and systems for detecting potential malware, in particular, where the malware enters an endpoint, and modeling the attack of the malware.

BACKGROUND OF THE INVENTION

Malware is any software used to disrupt computer operations, gather sensitive information, or gain access to private assets residing in computer systems. This can lead to the malware creator or other unauthorized parties gaining access to the computer system and private information stored on the computer system being compromised. Malware includes computer viruses, worms, trojan horses, spyware, adware, key loggers, and other malicious programs. These programs can appear in the form of computerized code, scripts, and other software.

Software, such as, for example, anti-virus, anti-spyware, anti-malware and firewalls, are depended upon by computer users for protecting against malware and other malicious attacks. These types of protective software also help to identify malware attacks and take protective actions in response to identification of a malware attack.

SUMMARY OF THE INVENTION

The present invention provides computerized methods and systems which analyze voluminous amounts of data, and identify operations of the data which are directly attributable to malware.

The present invention is directed to computerized methods and systems, which determine an entry point or source of an attack on an endpoint, such as a machine, e.g., a computer, node of a network, system or the like.

The present invention also provides methods and systems which utilize the attack execution/attack or start root, to build an attack tree, which shows the attack on the end point and the damage caused by the attack, as it propagates through the machine, network, system, or the like. The attack tree of the present invention presents correlations between events that are associated with the attack and how such events are connected or otherwise associated with each other.

Embodiments of the invention are directed to a method for determining an entry point for an attack on an endpoint. The method comprises: obtaining an attack root; and, identifying a sequence of processes, and executions and creations associated with each of the process of the sequence, the sequence originating at the attack root.

Optionally, the attack root includes a process.

Optionally, the process of the attack root includes a file.

Optionally, each process of the sequence of processes is based on at least one discrete event.

Optionally, the discrete events from the same process of the sequence of processes are merged into a single summarized event.

Optionally, the identifying a sequence of processes, and executions and creations associated with each of the process of the sequence of processes, includes: categorizing each identified process by a process type; and, obtaining a creator process associated with each identified and categorized process.

Optionally, the categories for categorizing each the processes are selected at least one of: payload processes; container/compression/installer processes; executables; rename processes; registry consumer processes; network processes; and processes not categorized as one of payload processes, container/compression/installer processes, executables, rename processes, registry consumer processes, and network processes.

Optionally, the end point includes at least one of a machine, including a computer, node of a network or system.

Embodiments of the invention are directed to a method for determining the extent of an attack on an endpoint. The method comprises: obtaining an attack root; reading the attack root; analyzing the attack root to output subsequent processes associated with the attack root; reading each of the subsequent processes; and, analyzing each of the subsequent processes to output additional processes associated, until there are not any more processes to be read.

Optionally, the attack root includes a process.

Optionally, the process of the attack root includes a file.

Optionally, the reading and analyzing for the attach root and each subsequent process is performed iteratively.

Optionally, the analyzing the attack root and the subsequent processes includes obtaining at least one of: executions and operations of malicious objects of files, malicious Uniform Resource Locators (URLs), and, malicious Internet Protocol (IP) addresses.

Optionally, the analyzing the attack root and the subsequent processes includes: creating a list of the files obtained from the file paths associated with each read attack root and each read subsequent process and ordering; and, obtaining: i) processes creating file in the file list that were not in the entry point; and, ii) process instances of files from the file list that were executed.

Optionally, the analyzing the attack root and subsequent processes includes, obtaining at least one of parent processes and child processes of the attack root and the subsequent processes.

Optionally, the analyzing the attack root and the subsequent processes includes obtaining network operations processes from at least one of the attack root and the subsequent processes.

Optionally, the analyzing the attack root and the subsequent processes includes obtaining processes which opened malicious Uniform Resource Locators (URLs) and malicious Internet Protocol (IP) addresses.

Optionally, the analyzing the attack root and the subsequent processes includes: obtaining process injecting into at least one of the attack root or the subsequent processes; and, obtaining processes injected by one of the attack root or the subsequent processes.

Optionally, the end point includes at least one of a machine, including a computer, node of a network or system.

Embodiments of the invention are directed to a computer usable non-transitory storage medium having a computer program embodied thereon for causing a suitable programmed system to detect the extent of an attack on an endpoint, by performing the following steps when such program is executed on the system. The steps comprise: obtaining an attack root; reading the attack root; analyzing the attack root to output subsequent processes associated with the attack root; reading each of the subsequent processes; and, analyzing each of the subsequent processes to output additional processes associated, until there are not any more processes to be read.

Optionally, the attack root includes a process.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "process", also referred to herein as an "application process", refers to an instance of a computer program that is being executed (e.g., executable file). While a computer program is a passive collection of instructions; a process (application process) is the actual execution of those instructions. Each process provides the resources necessary to execute the program file. A process includes, for example, an image of the executable machine code associated with a program, memory (typically some region of virtual memory); which includes the executable code, process-specific data (input and output), a call stack (to keep track of active subroutines and/or other events), and a heap to hold intermediate computation data generated during run time, operating system descriptors of resources that are allocated to the process (application process), such as handles (Windows), Security attributes, such as the process owner and the process' (application process') set of permissions (allowable operations), a unique identifier etc. A non-exhaustive list of examples of processes (application processes) includes:

processes (application processes) that are instances/executions of compression applications (application process), such as, for example, zip applications, RAR applications and the like;

processes (application processes) that are instances/executions of network applications (application processes), such as, for example, email clients, web browsers (e.g. chrome, firefox, etc.), and FTP (file transfer protocol) clients;

processes (application processes) that are instances/executions of payload applications (application processes), such as, for example, Microsoft®. Office applications and Adobe®. PDF Reader®;

processes (application processes) that are instances/executions of executables written and maintained by the creators of the operating system (OS) (i.e., Microsoft) and packaged on the computer as part of the operating system, such as, for example, services.exe and explorer.exe.

A "payload application" refers to an application process that is generally considered to be benign but that can be used for malicious intent if used to execute a malicious file. A non-exhaustive list of examples of payload application processes includes:

Microsoft® Office applications (e.g., Microsoft® Word, Microsoft® Excel, Microsoft® Project, etc.);

Adobe® PDF Reader®.

A "compression/installer (install helper) application (application process)" refers to an application that is primarily purposed to reduce the size of a file and combine multiple files into a single file in order to facilitate easier storage, transmission and distribution. Compression applications (application processes) are generally considered to be benign but can be used for malicious intent if used to extract a malicious file. A non-exhaustive list of examples of compression applications includes:

Zip applications;

RAR applications;

7z applications;

MISEXEC.

A "network application" refers to an application (application process) that is primarily purposed to initiate and maintain a connection between the computer running the network application and other computers on a network or over the Internet. A non-exhaustive list of examples of network applications includes:

email clients;

web browsers (e.g. chrome, firefox, etc.);

FTP clients.

The terms "click", "clicks", "click on", "clicks on", "activates", and "activation", involves the activation of a computer pointing apparatus, such as a device commonly known as a mouse, or a touch, swipe, contact, or the like on a touch screen, on a location on a computer screen display, including screen displays of tablets and mobile telephones, to cause the computer to take actions, such as opening emails and attachments, beginning file downloads, and the like.

A uniform resource locator (URL) is the unique address for a file, such as a web site or a web page, that is accessible over Networks including the Internet.

An Internet Protocol address (IP address) is a numerical label assigned to each device (e.g., computer, printer) participating in a computer network that uses the Internet Protocol for communication. An IP address serves two principal functions: host or network interface identification and location addressing. Its role has been characterized as follows: "A name indicates what we seek. An address indicates where it is."

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 3B-1 and 3B-2 are a diagram of an example of a malicious attack;

DETAILED DESCRIPTION

Figure 1:
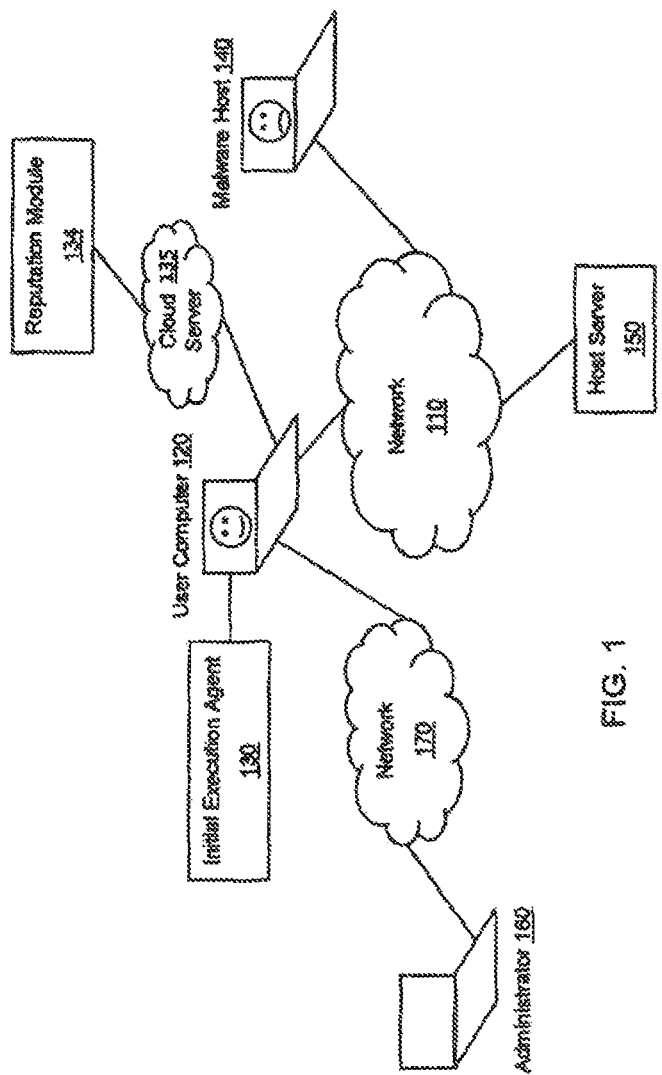
FIG. 1 is a diagram illustrating a system environment in which an embodiment of the invention is deployed.

The present invention is directed to computerized methods and systems, which determine the entry point or source of an attack on an endpoint, such as a machine, e.g., an endpoint client computer, system, node of a network, or the like. An agent installed on an endpoint client monitors activity on the endpoint client computer, machine, system, network, or the like. When a potential attack is detected by suspicious or malicious activity of a process, either by the agent or a similar agent, the agent traces the process tied to the suspicious or malicious activity to the entry point of the suspicious or malicious process by executing a sequence of processes. As a result, the agent is able to identify the entry point of the attack initiated at the endpoint. The agent also utilizes the attack execution/attack or start root, to build an attack tree. The attack tree shows the attack on the end point and the damage caused by the attack, as the attack propagates through the endpoint, e.g., the machine, network (e.g., node of the network), system, or the like.

In the context of this document, the term "data object" generally refers to files, registry keys, network operations, file modifications, registry entries, injections, mutexes, pipes, hooks, and application arguments.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

FIG. 1 shows an example environment in which embodiments of the present disclosure are performed over a network 110. The network 110 may be formed of one or more networks, including, for example, the Internet, cellular networks, wide area, public, and local networks. The embodiments include a system 120' (FIG. 2), including, for example, an agent 130, on an endpoint client, for example, a user computer 120 (linked to the network 110). The agent 130 determines the initial execution of an attack (i.e., malware attack) on the user computer 120. Based on this initial execution of an attack, the entry point of the attack can be determined (by the entry point determination module 138) and the attack can be modeled, for example, in the form of an attack tree, by the attack modeling module 139, as shown in FIG. 2.

In a non-limiting example, a malware host 140, also linked to the network 110, creates a malicious file that when executed calls a process that may be a malicious process or a benign process. The malicious file is made available to the host server 150 by the malware host 140. The host server 150 is linked to the network 110 and represents numerous servers hosting, for example, web sites, accessible through web servers (not shown). The malicious file enters the user computer 120 via the access of the host server 150 by the user computer 120.

The agent 130 includes software, software routines, code, code segments and the like, embodied, for example, in computer components, modules and the like, that are installed on machines, such as the user computer 120. For example, the agent 130 performs an action when a specified event occurs, as will be further detailed below. The agent 130 may be instructed to perform such actions by an administrator 160. The administrator may be a computer separate from the user computer 120 linked to the user computer 120 via a private network 170 such as an Intranet. Alternatively, the administrator 160 may be linked to the user computer 120 via the network 110.

Figure 2:
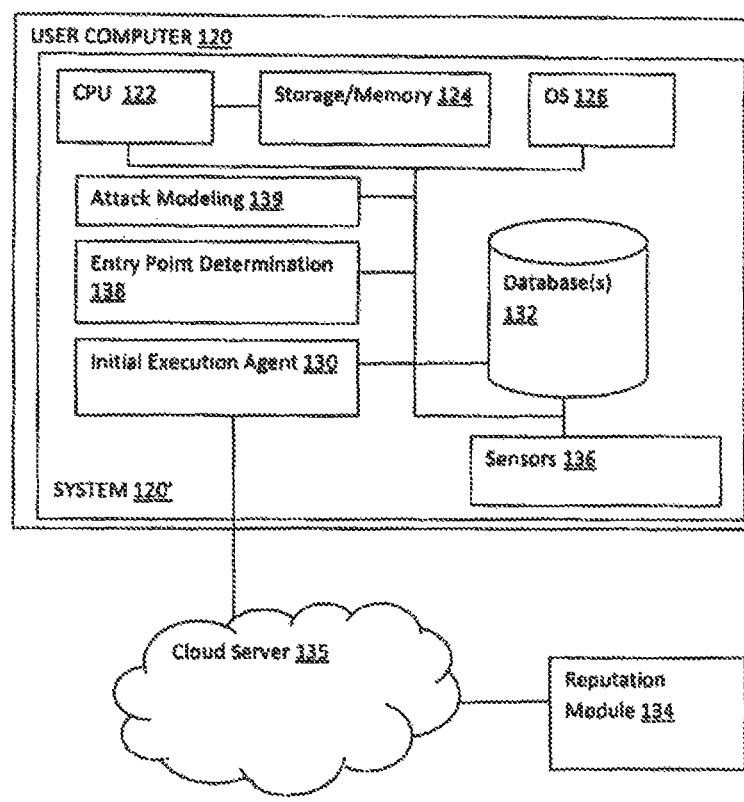
FIG. 2 is a diagram of the architecture of an exemplary system embodying the invention.

FIG. 2 shows the user computer 120 and the system 120' therein, as an architecture, with the agent 130 incorporated into the system 120' of the user computer 120. The system 120' is referred to as "the system" in the descriptions of FIGS. 3A, 3B-1, 3B-2, 4, 5A and 5B below. All components of the user computer 120 and/or system 120' are connected or linked to each other (electronically and/or data), either directly or indirectly.

Initially, the user computer 120 (and system 120') includes a central processing unit (CPU) 122, a storage/memory 124, and an operating system (OS) 126. The processors of the CPU 122 and the storage/memory 124, although shown as a single component for representative purposes, may be multiple components.

Figure 4:
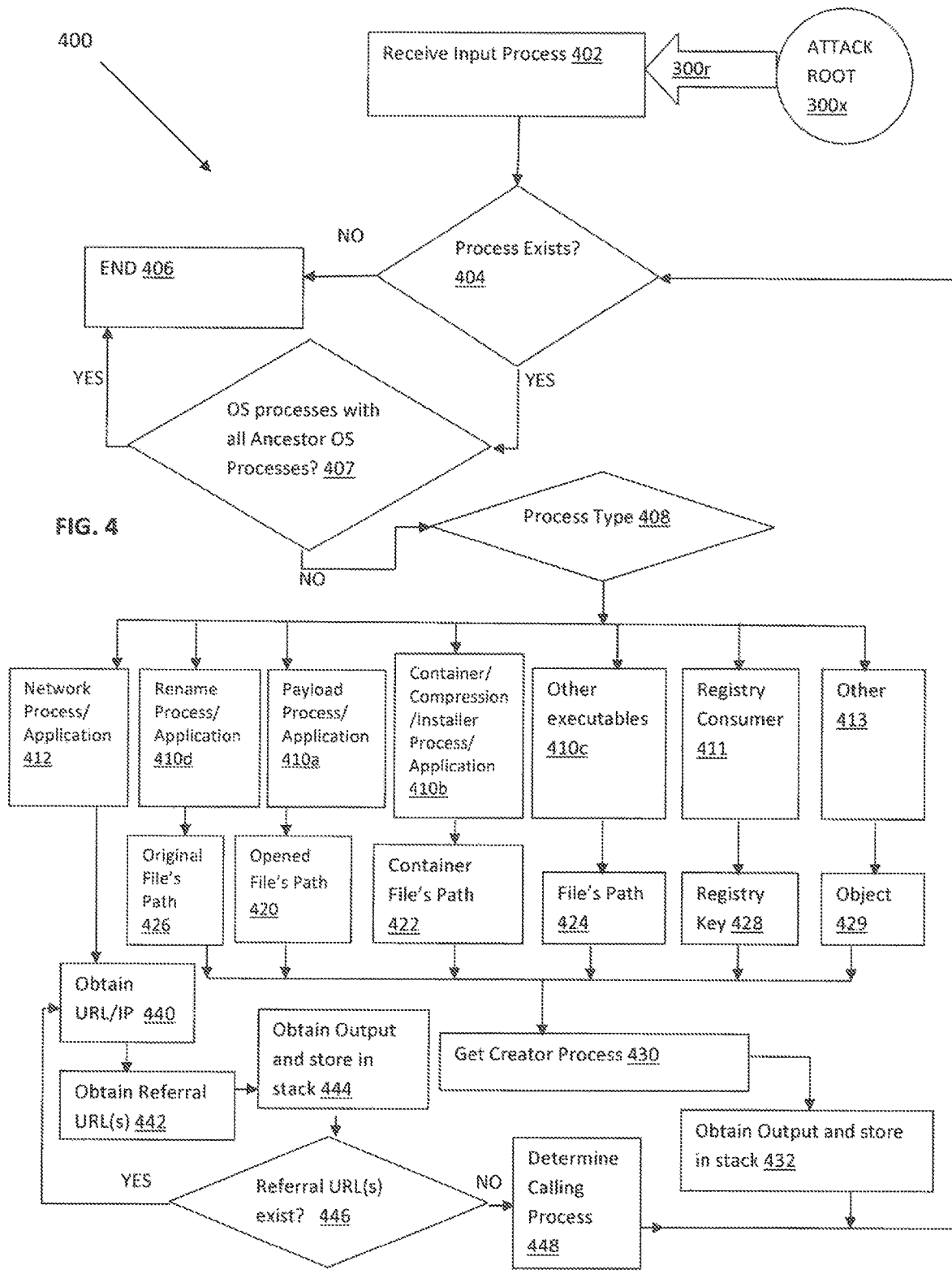
FIG. 4 is a flow diagram illustrating a process to identify an entry point of a malicious process according to an embodiment of the invention; and, FIGS. 5A and 5B are a process for creating an attack tree, such that the attack tree can be diagrammed, in accordance with embodiments of the invention.
Figure 5A:
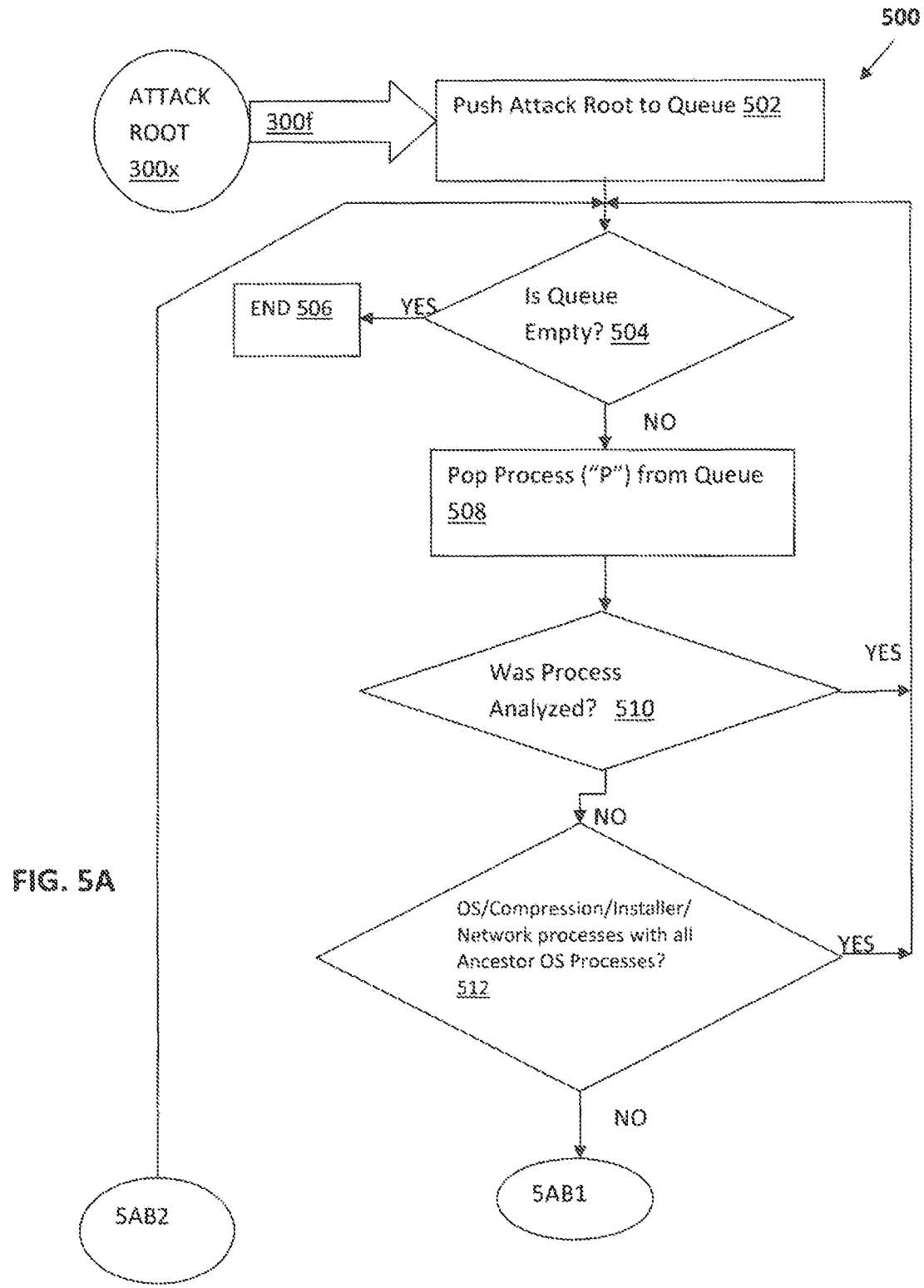
Figure 5B:
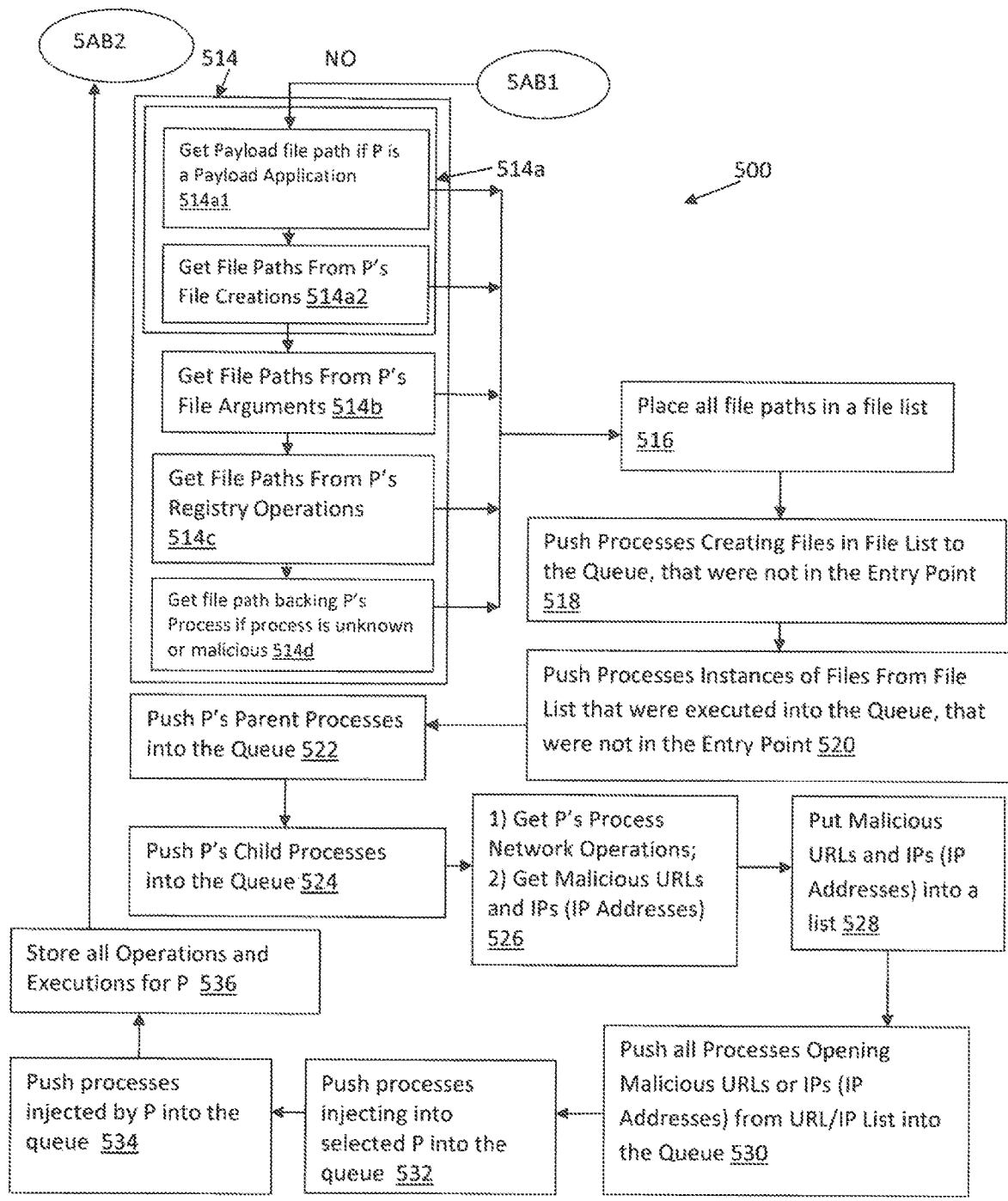

The CPU 122 is formed of one or more processors, including microprocessors, for performing the user computer 120 functions, including executing the functionalities and operations of the agent 130, as detailed herein, the OS 126, and including the processes shown and described in the flow diagrams of FIGS. 4, 5A and 5B. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the agent 130, and all instructions for executing the processes of FIGS. 4, 5A and 5B, detailed herein.

The OS 126 includes any of the conventional computer operating systems, such as those available from Microsoft of Redmond Wash., commercially available as Windows® OS, such as Windows® XP, Windows® 7, MAC OS from Apple of Cupertino, Calif., or Linux.

Activity that occurs on the user computer 120 is sensed by a sensor or sensors 136. In particular, the sensors 136 are configured to sense changes that occur on the user computer 120. Examples of activity sensed by the sensors 136 includes, but is not limited to file accesses, network accesses, application accesses, registry accesses, file creations, file modifications, process injections, process calls and process creations. The activity sensed by the sensors 136 is written to (i.e., stored in) an activity log which can be maintained in a structured format, such as, for example, a database(s) 132, accessible by the agent 130, entry point determination module 138 and attack modeling module 139.

The database 132 may be installed with the system 120', or may be provided on a remote server, such as, for example, a cloud server 135 (and remain part of the system 120'). Accordingly, the activity log (stored in the database 132) includes a listing of the executions and creations of the processes, also known as "application processes", and data objects on the user computer 120. The activity log may be programmed or otherwise configured to retain the above mentioned information for blocks of time, for example, weeks, months and years. The activity log may also be programmed or otherwise configured to overwrite information pertaining to older activity with information pertaining to recent activity. As such, the activity log retains information for a sliding window of time. Other database(s) 132 include those associated with stacks, queues, and lists, e.g., file and URL/IP lists, respectively, and detailed below.

The agent 130 makes determinations regarding processes, also known herein as "application processes", executed on the user computer 120 based on the reputations of the processes called, and by extension, the reputations of files that when accessed or opened result in the execution of processes. The reputations of the above mentioned processes and files are provided to the agent 130 by a reputation service in the form of a reputation module 134. The reputation module 134 is typically provided on a remote server, such as, for example, a cloud server 135, that is accessible by the agent 130. Alternatively, the reputation module 134 may be installed on the user computer 120 as part of an anti-malware software suite such as, for example, Microsoft Security Essentials, Norton anti-virus, and McAfee anti-virus. Note that the reputation module 134 may also be installed as part of the agent 130. Accordingly, the agent 130 may be configured to perform processes (not shown) for classifying processes and files into the three above mentioned categories.

The reputation module 134 analyzes the files accessed and the processes executed on the user computer 120, either instantaneously or over a period of time. As a result, the reputation module 134, which may also link to a reputation service, is able to classify all application processes executed on the user computer 120 into three categories: malicious processes, unknown processes, and non-malicious processes (i.e., good processes). As an example, processes run from payload applications, for example, MS Word®, MS Excel®, are typically classified as non-malicious processes. The process called by the execution of the Windows® OS executable file sdbinst.exe is also an example of a non-malicious process.

The reputation module 134, regardless of its location, may also be part of the system 120'.

An entry point determination module 138 performs processes such as those shown in FIG. 4 and detailed below, for determining the point (location) where the malicious or suspicious process entered the endpoint, for example, the user computer 120, system 120', network (e.g., network node) or the like, and may be based on the initial execution of the attack, e.g., the attack root 300x (FIG. 3A) of the malicious process or a suspicious process.

An attack modeling module 139 allows for an attack tree to be created and plotted (diagrammed), based on, for example, the entry point of the malicious or suspicious process, at the requisite endpoint.

To better understand the operation of the components, including the agent 130 and all instructions for executing the processes of FIGS. 4 and 5A and 5B, FIG. 3A shows a diagram of how a malicious attack is analyzed in accordance with the invention, and an example of a malicious attack 300 as carried out on the user computer 120. This example malicious attack is illustrated in FIGS. 3B-1 and 3B-2.

In the example malicious attack, the OS 126 of the user computer 120 is a Windows® OS. The attack 300, illustrated in FIGS. 3B-1 and 3B-2 depicts paths that include creations of files and data objects (exemplified by broken line arrows), execution events in which a process (application process) executes (i.e., calls) another process (application process) (results of which are exemplified by solid arrows), and accesses, such as, for example, downloads, uploads, data transfers, and, file transfers, (exemplified by broken line arrows). The broken line arrows and solid line arrows consistent with the aforementioned arrows are in the Legend of FIG. 3A. Additional paths in alternative example of attacks, including malicious attacks, may be depicted to show network operations, file modifications, registry entries, injections, mutexes, pipes, hooks, and application arguments.

Figure 3A:
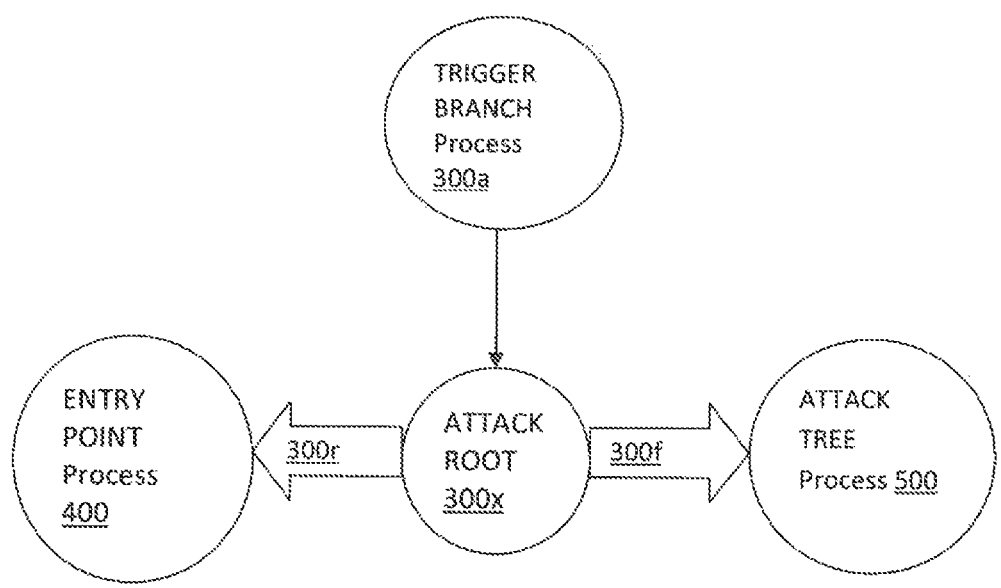
FIG. 3A is a diagram of showing the attack root associated with a malicious attack.
Figures 2, 3B:
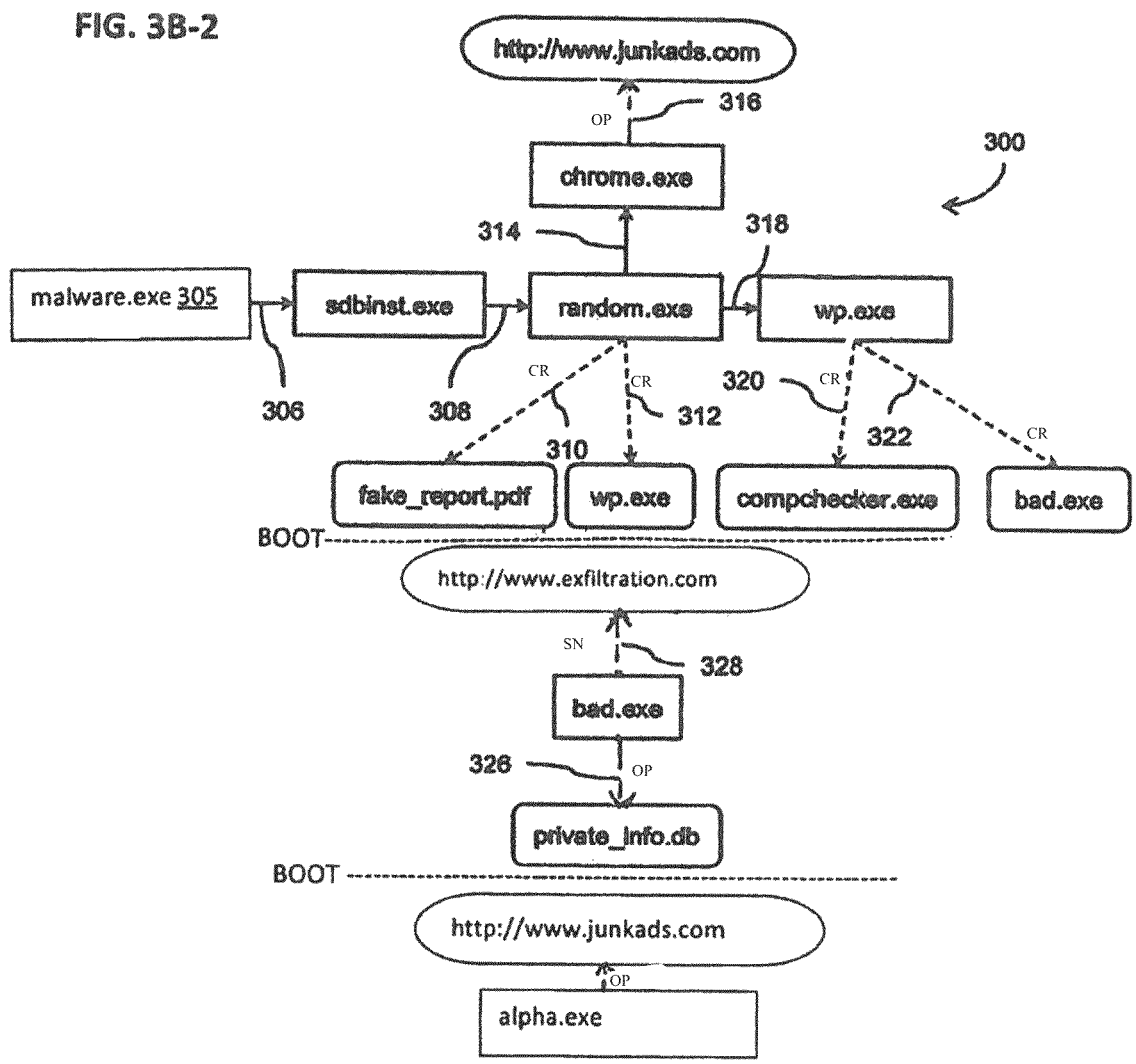

In FIG. 3A, the Attack Root 300x is determined, for example, by a trigger branch process 300a, which identifies the Attack Root 300x. The attack root 300x, is provided either externally, or by a trigger branch process 300a as disclosed in commonly owned U.S. patent application entitled: Method and System for Determining Initial Execution of an Attack, U.S. patent application Ser. No. 14/963,265. The Attack Root 300x is the start of the malicious attack, and is a process, and may include a file. For example, the Attack Root 300x may be a payload process such as MS Word® from Microsoft or an unknown or malicious executable. In this case, the attack root as a payload application process (e.g., MS Word®) is such that a document opened in the payload process is the file of the attack root.

The Attack Root 300x is preceded (looking backward in time as represented by the arrow 300r) by an entry point process 400 (also known as an entry point determining process). The entry point is where and/or how the malicious process or file entered the machine, system, network or the like. The entry point process 400 looks at discrete events in each step of the entry point process 400. An example entry point process 400 is shown in FIG. 4 and is described in association therewith.

The Attack Root 300x is proceeded (looking forward in time as represented by the arrow 300f) by an attack tree process 500 (also known as an attack tree generating process). The attack tree process 500 begins at the first malicious execution and shows the damage done to the machine, system or network, by the malicious process or file. The attack tree process 500 looks at the damage caused by the malicious process or file, in terms of processes and threads. An example attack tree process is shown in FIGS. 5A and 5B, and is described in association therewith.

Entry Point Process Overview

An example malicious attack 300 is illustrated in FIGS. 3B-1 and 3B-2, which form a single diagram, to which attention is now directed. The entry point is determined by an entry point process 400 (FIG. 4), which is, for example, performed as an algorithm. The entry point process 400 examines events before the malicious attack to evaluate how the attack entered the system prior to its execution. For example, in FIGS. 3B-1 and 3B-2 the Attack Root (represented in FIG. 3A as Attack Root 300x) is the process "malware.exe" 305 which is the identical block in both drawing figures. Also, as FIGS. 3B-1 and 3B-2 combine to form a single entity, the "Legend" of FIG. 3B-1 is also applicable to FIG. 3B-2. Malware.exe 305 is stored, for example, as c:\downloads\malware.exe, with the application process (process) being malware.exe, which executes in memory. A process instance is a special execution of an executable file, at a specific time. There can be multiple process instances of the same executable running at the same point in time, but with different start time times. In addition, these may be multiple instances of an executable running at different times, such as after boots.

The entry point process 400 begins with the attack root 300x, also known as the start process for an attack. An example of the attack root 300x, which has been determined, is shown in FIG. 3B-1 (and also in FIG. 3B-2). The attack root 300x in both FIGS. 3B-1 and 3B-2 is the attack root file, "malware.exe" 305. The entry point is determined, going forward in time, as follows (these steps are the output of the process of FIG. 4):

1. chrome.exe, a process, opened www.amail.com, an email program, as per arrow 301a;
2. chrome.exe, a process, opened www.mymail.com, an email program, and www.mymail.com was referred by www.amail.com, as per arrow 301a';
3. chrome.exe, a process, created a file cr2.download, at arrow 301b;
4. chrome.exe, a process, renamed cr2.download as the container file malware.zip;
5. winzip.exe, a process, opened the file malware.zip, as per arrow 302c;
6. winzip.exe created the file malware.exe, as per arrow 302b; and,
7. explorer.exe executed three processes, chrome.exe, the process winzip.exe, as per arrow 302a, the process malware.exe, as per arrow 303 (OS ancestor processes executed explorer.exe, these OS ancestor processes are a chain of processes from which the machine, system of the like booted up);
8. the process malware.exe 305 executed, as per arrow 306, reiterating that malware.exe 305 is the attack root.

Entry Point Summary Process Overview

These aforementioned events can be summarized by the entry point summary algorithm, which collapses (merges or consolidates) events, e.g., discrete events, from the same process into one summarized event. Common behavior is modeled to achieve a higher level description, such as modeling steps 1-3 above where chrome's download behavior can be described as opening a website and creating a file. Such summarized activity of the steps outline above is for example as follows:

1. Chrome accessed www.mymail.com and created malware.zip
2. Winzip opened malware.zip and created malware.exe
3. The User 120 (FIG. 1) executed malware.exe, for example, by a mouse "click" or other activation.

Attack Tree Process Overview

Turning to FIG. 3B-2, the execution of the process malware.exe 305 also executes 306 a Windows® OS process, sdbinst.exe. The execution of the process sdbinst.exe causes the execution 308 of the process random.exe.

The execution of the process random.exe causes the execution 314 of the process chrome.exe in order to access 316 the web site www.junkads.com. The execution of the process random.exe also causes the creation 310 of the file fake_report.pdf. The execution of the process random.exe also causes the creation 312 of the file wp.exe. The execution of the process random.exe also causes the execution 318 of the process wp.exe based on the created file wp.exe 312.

The execution of the process wp.exe causes the creation 320 of the file compchecker.exe, and the creation 322 of the file bad.exe. The creation of the file bad.exe by the process wp.exe additionally places the file bad.exe in the OS startup folder, for example, the Windows® OS startup folder. As a result, upon rebooting (i.e. reloading of the OS 126 into memory) and/or restarting of the user computer 120, indicated by "BOOT" in FIG. 3B-2, the process bad.exe is, for example, executed by a Windows® OS process, such as, explorer.exe (not shown).

The execution of the process bad.exe causes the access 326 of private information on the user computer 120, namely private_info.db. The execution of the process bad.exe also causes data to be sent to the URL http://www.exfiltration.com, via network transfer 328, of information accessed on the user computer 120 to external parties.

In a second BOOT, i.e., restarting of the user computer 120, a process alpha.exe opens the URL http://www.junkads.com.

As should be apparent, the application processes executed, and files created during the malicious attack illustrated in FIGS. 3B-1 and 3B-2, span across multiple boots of the user computer 120. Specifically, the activities described by the identifiers 301-322 are executed and/or created on the user computer 120 subsequent to a first boot of the user computer 120, whereas the activities described by the identifiers 326, 328 are executed and/or occur on the user computer 120 subsequent to a second boot of the user computer 120 that occurs after the first boot. As a result, the application process bad.exe persists even after termination of the application process wp.exe.

Accordingly, the application process malware.exe, and the process bad.exe, are linked by a sequence of application processes, the creations and executions (i.e., calling) of which are retained in the activity log. Each application process in the sequence is successively linked to at least one other application process in the sequence. Moreover, each application process stemming from the initial process execution of the attack is linked to the process malware.exe by a sequence of processes. The activity log provides the agent 130 with the necessary information for ascertaining the above mentioned process linkages.

In the context of this document, the term "ancestor process" or "ancestor processes" of a specific process generally refers to the process or processes that were previously successively called in order to execute the specific application process. For example with respect to the malicious attack 300 of FIGS. 3B-1 and 3B-2, the ancestor processes of wp.exe are the following application processes: explorer.exe, malware.exe, sdbinst.exe, and random.exe. Accordingly, the ancestor process or processes of a specific process identified as part of a malicious attack are used to provide the above mentioned linkage between the initial process execution of the attack and the specific process.

The "attack tree" is referred to as a tree, as the attack tree is the graphic representation of a hierarchy. Accordingly, the attack can be viewed as a virtual tree, which is non-binary and is formed of nodes and branches. The nodes are, for example, process instances, including those which may occur after boots. The branches represent, for example, executions, creations, and injections. The creations and executions as part of the tree are possible with the invention, since nodes can occur after boots. The start of the tree is the attack root.

Entry Point Determining Process

Attention is now directed to FIG. 4, which shows a flow diagram detailing a computer-implemented process 400 in accordance with embodiments of the disclosed subject matter. This computer-implemented process includes an algorithm for determining the entry point for malware or other suspicious process, in particular, the entry point of where the malware or suspicious process entered the endpoint, such as a system, machine, network (e.g., network node), or the like. Reference is also made to elements shown in FIGS. 1, 2, 3A, 3B-1 and 3B-2. The process and subprocesses of FIG. 4 are computerized processes performed by the system 120' including, for example, the CPU 122 and associated components, such as the entry point determination module 138, at the user computer 120, which as shown represents a client or client computer. The aforementioned processes and subprocesses can be, for example, performed manually, automatically, or a combination thereof, and, for example, in real time.

Initially, the process 400 of the invention for determining the entry point of the attack (hereinafter, "the entry point determining process"), begins at the Attack Root 300x and looks backward (rearward) in time, as indicated by the arrow 300r, as described above for FIG. 3A.

The entry point determining process now moves to block 402. At block 402, the attack root process 300x, i.e., now the application process, which ran or executed, including process details, is received as the input application process. Next, at block 404, the system 120' determines whether the application process exists, e.g., is the application process known to the system 120', and as such, exists in historical databases of the system.

At block 404, should the application process not exist, the entry point determining process ends at block 406. However, at block 404, should the application process exist, as it is known to the system, as it is stored in the database, and the entry point determining process moves to block 407. At block 407, it is determined whether the application process is an OS (Operating System) process with ancestor OS processes, for example, Windows®. (Microsoft® of Redmond Wash., USA). If yes, at block 407, the entry point determining process moves to block 406, where it ends. If no, at block 407, the entry point determining process moves to block 408.

At block 408, the type of the application process is determined. This determination is typically made by the reputation module 134. The entry point determining process then moves to any of blocks 410a-410d, 411, 412 and 413, based on process type. For example, application processes 410a-410d are all processes that end up with a file path, and are processes in a loop. A "file path" as used in processes 400 and 500 of FIG. 4, and FIGS. 5A and 5B is, for example, a directory/location, such as in memory, storage media or the like, where the file is stored.

Application process 411 is for registry consumer application processes (processes) that progress to a registry key, which is also in the aforementioned loop. Application process 412 is for network processes, and does not follow the aforementioned loop. Application Process type 413 is for all other application process, which are not in accordance with the types of blocks 410a-410d, 411 or 412, and follows the aforementioned loop.

At block 410a, a payload process is a process or application which is typically benign, but can carry malicious data. Some exemplary payload processes (applications) are those from Microsoft® Office®, as well as PDF Reader from Adobe®. The process moves to block 420, where it is determined the path of the payload file which was opened in the payload process. For example, should the payload application process be MS Word®, it would be important to know the file path of the document opened in MS Word®. Also, in the cases of a process type being detected as executed by explorer.exe (from Microsoft®), when extracted from a .zip file, this will be classified as a payload process and accordingly, the entry point determining process moves to blocks 410 and then to block 420 as detailed immediately above.

The entry point determination process then moves to from block 420 to block 430. At block 430, the application process that created the previous file's path, i.e., the application process that created the file path of block 420, is determined.

Returning to block 410b, a container/compression/installer (install helper) application process has been detected. A "compression application," as mentioned above, is an application whose primary purpose is to reduce file size, making the file easier to store and send. Example compression applications include .zip applications. RAR applications (RAR is a proprietary archive file format that supports data compression, error recovery and file spanning), and 7z applications (7Z files are created by 7-Zip, a file archive compression utility that can be used on any computer. These files can be opened using any available compression program, including the 7-Zip, an open source tool. Opening 7z files is done for example, as disclosed at: http://www.openthefile.net/extension/7z. The process moves to block 422, where the file that was opened in the container/compression/installer application, such as .zip files, is determined. The entry point determination process then moves to block 422, where the container file's path, of the container file which was opened, is determined.

The entry point determination process then moves to block 430, where the application process that created the previous file's path, i.e., the application process that created the file path of block 422, is determined.

Returning to block 410c, the application process is an executable. Executables include, for example, in a Windows® environment, .exe, .ser, .bat, and, .com files. The entry point determining process moves to block 424 where the file path of the executable is obtained.

The entry point determination process then moves to block 430, where the application process that created the previous file path, i.e., the application process that created the previous file's path, i.e., the application process that created the file path of block 424, is determined.

At block 410*d*, the process type is a rename application process, and is determined. The entry point determination process then moves to block 426, where the original file's path, from where the renamed process was renamed is determined.

The entry point determination process then moves from block 426 to block 430. At block 430, the application process that created the previous file's path, i.e., the application process that created the file path of block 426, is determined.

Returning to block 411, the application process is a registry consumer application process, for example, REGEDIT. The entry point determining process moves to block 428 where the registry key is obtained. The entry point determination process then moves to block 430, where the application process that created the registry key (of block 428), is determined.

Returning to block 430, the entry point determination process moves to block 432, where the output of the loop is stored, for example, in storage media, such as a stack. The entry point determination process then moves from block 432 to block 404, from where the respective application processes are resumed from block 404 of the entry point determination process. Moving to block 412, the application process is a network process. A "network process/application" is a process/application whose primary purpose is to initiate and maintain a connection between the machine it is running on and other machines, along a network, or over the Internet. Network applications include, for example, browsers, FTP (file transfer protocol) clients, and e-mail clients. From this network process 412, any URLs (Uniform Resource Locators) and IP (Internet Protocol) addresses, that were opened by the network process are determined, such as the URL of a web site which hosted the network process, at block 440. Next, any referral URLs, e.g., URLs opened previous to the URL of block 440, are determined at block 442, such as the URL of a web site which hosted the network process.

The entry point determining process moves to block 444, where the output of blocks 412, 440 and 442 is stored, for example, in storage media, such as a stack. This stored output, in addition to the process instances, executions, creations, injections and the like, associated with various events, may also include information as to the time of the events.

It is then determined whether any of the URLs (from blocks 440 and 442) exist (are present) in the database, at block 446. If yes, there is a loop back to block 440, from where the process continues. If no, the process moves to block 448, where the calling process for the URL and/or IP is determined. The entry point determining process then moves to block 404, where the calling process is the application process for the resumption of the entry point determination process, from block 404.

Returning to block 413, the application process is a process that is not one of the application processes of blocks 410*a*-410*d*, 411 or 412. An exemplary "other" process may be a MUTEX. The entry point determining process moves to block 429 where the object, e.g., iexplore.exe, is obtained.

The entry point determination process then moves to block 430, where the application process that created the previous object, i.e., the application process that created the object of block 429, is determined. From block 430, the entry point determining process moves to block 432, where output is stored in the stack, and then to block 404, from where it resumes.

Entry Point Determining Process—Example

Referring back to FIGS. 3A and 3B-1 and example of the entry point determining process 400 of FIG. 4 is now described. Initially, from FIG. 3A-1 the Attack Root 300*x* is the process "malware.exe", of FIG. 3B-1.

The process malware.exe is the input application process (process) of block 402, and exists at block 404. It is not an OS process with all ancestor OS processes at block 407, and at block 408, its application process type is an "Other executable of block 410*c*. The file path of block 424 is that of malware.exe (for example: c:\downloads\malware.exe"). Winzip.exe was the creator application process for malware.exe at block 430, so winzip.exe is now the application process at block 404, from where the entry point determining process resumes. The stack at block 432 now contains: "winzip.exe created malware.exe".

Resuming from block 404 with winzip.exe, this application process exists at block 404. It is not an OS process with all ancestor OS processes at block 407, and at block 408, its application process (process) type is a "container/compression/installer application process" of block 410*b*. The container file path of block 422 is the container file opened in winzip.exe at the time of creation of the malware.exe. In this example, the container file opened is "malware.zip". Block 430 then determines the creator process of malware.zip which is chrome.exe. From block 430, the output is stored in a stack, as per block 432. The stack at block 432 now contains: "winzip opened malware.zip, winzip.exe created malware.exe". From block 432, the entry point determining process moves to block 404, from where it resumes. Chrome.exe (from block 430) is now the application process at block 404, from where the entry point determining process resumes.

Resuming again from block 404 with chrome.exe, this application process exists at block 404. It is not an OS process with all ancestor OS processes at block 407, and at block 408, its process type is a "Rename process" of block 410*d*. The original file path which had the file name "cr2.download", prior to the rename is extracted, at block 426.

At block 430, it is then determined that the creator process of "cr2.download" was chrome.exe. The output is stored in the stack at block 432. The stack now contains: "chrome created cr2.download, chrome renamed cr2.download to malware.zip, winzip opened malware.zip, winzip.exe created malware.exe". From block 430, and moving through block 432, chrome.exe is now the application process at block 404, from where the entry point determining process resumes.

Resuming from block 404 with chrome.exe, this application process exists at block 404. It is not an OS process with all ancestor OS processes at block 407, and at block 408, its process type is a Network Process of block 412, as chrome.exe called the e-mail websites, www.mymail.com, which was referred from amail.com.

At block 440 the URL obtained is www.mymail.com, and the referral URL of block 442 is www.amail.com. Moving to block 444, the stack now contains: "chrome accessed www.amail.com and was referred to www.mymail.com, chrome created cr2.download, chrome renamed cr2.download to malware.zip, winzip opened malware.zip, winzip.exe created malware.exe".

At block 446, no more referral URLs exist, with explorer.exe being the calling process for chrome.exe, at block 448. Accordingly, explorer.exe is now the process at block 404, from where the entry point determining process resumes.

Resuming from block 404 with explorer.exe this process exists at block 404. As explorer.exe is an OS process with all ancestor OS processes at block 407, the entry point determining process moves to block 406 where it ends. Popping from the stack, the following events occur:

1. chrome accessed www.amail.com and was referred to www.mymail.com.
2. chrome created cr2.download.
3. chrome renamed cr2.download to malware.zip.
4. winzip opened malware.zip.
5. winzip.exe created malware.exe.

Entry Point Summary Determining Process—Example

Taking the example from the previous section the entry point summary process simply takes the first event and last event of each set of sequential events that share the same process instance. This results in the following:

1. chrome accessed www.amail.com and creates malware.zip
2. winzip opens malware.zip and creates malware.exe Attack Tree Generating Process Attention is now directed to FIGS. 5A and 5B, which show flow diagrams detailing computer-implemented processes 500 for generating an attack tree in accordance with embodiments of the disclosed subject matter. Reference is also made to elements shown in FIGS. 1, 2, 3A, 3B-1, 3B-2. The process and subprocesses of FIGS. 5A and 5B, are computerized processes performed, for example, by the system 120'. The aforementioned processes and sub-processes can be, for example, performed manually, automatically, or a combination thereof, and, for example, in real time.

FIGS. 5A and 5B detail an example attack tree generating process 500. The results of this process, e.g., the output is plotted, by the system 120', for example, by the attack modeling module 139 (in conjunction with the CPU 122, Storage/Memory 124 and OS 126), so that it appears as a graphic, in accordance with the attack tree shown in FIGS. 3B-2. The output of this attack tree generating process includes process instances and all of their operations, for example, such as, all network file registries, memory operations, injections, and the like.

The process 500 begins at the Attack Root 300x. As indicated above, the Attack Root 300x for the process 500 originates with a Root process, provided from multiple sources, including, for example, a trigger branch process, from commonly owned US patent application, entitled: Method and System for Determining Initial Execution of an Attack, U.S. patent application Ser. No. 14/963,265. As the attack tree generating process 500 looks forward to determine damage caused by the malicious attack, the forward looking nature of the process 500 is illustrated by arrow 300f, as the attack tree generating process moves to block 502.

At block 502, the attack root 300x is pushed into the queue, e.g., storage media in the system 120'. Next, at block 504, it is determined (by the system 120'), whether the queue is empty. Should the queue be empty at block 504, the attack tree generating process ends, at block 506. Should the queue not be empty at block 504, the process moves to block 508

Moving to block 508, an iterative process of the attack tree generating process begins, as application processes, referred to as "P", are read from the queue in succession, or "popped" from the queue. With each application process being removed and read, or "popped" from the queue. When an application process "P" is popped from the queue, this application process is part of the attack.

The attack tree generating process moves to block 510, where it is determined whether the process "P" was analyzed by the system 120'. If yes, the attack tree generating process moves to block 504, from where it resumes, as detailed above. If no, the attack tree generating process moves to block 512.

At block 512, it is determined whether the application process "P" is an OS/compression/network process with ancestor OS processes. If yes, at block 512, the attack tree generating process moves to block 504, from where it resumes, as detailed above. If no, at block 512, the attack tree generating process moves to block 514.

At block 514, formed of blocks 514*a*, 514*b*, 514*c*, 514*d* where file paths from application processes are obtained and placed into a file path list, at block 516. The file list includes, for example, a list in a database or other storage associated with the system, machine or the like.

At block 514*a*, file paths are obtained from application process "P's" file operations, for example, by looking for files created, renamed, written to, read or executed by the application process files. At block 514*a*1, one of the blocks that makes up block 514*a*, the payload file path is obtained should P be a payload application process. For example, if the payload process was MS Word®, it would be important to know the file path of the document opened in MS Word®. At block 514*a*2, the system 120' gets file paths from P's file creations (files created and renamed by P).

Moving to block 514*b*, file paths are obtained from application process "P's" file arguments, e.g., parameters, such as cmd.exe, c:/ibabatch.bat. Moving to block 514*c*, file paths from the application process "P's" registry operations are obtained, e.g., that are part of the value of the registry keys, put into the file list For example, the registry contains keys which controls the processes start up on a reboot. This algorithm extracts the file paths of processes that run on reboot from the registry.

Moving to block 514*d*, the file path backing the application processes "P's" is obtained, if the application process is unknown or malicious. The determination of unknown or malicious is based on the reputation of the file, as determined, for example, by the reputation module 134, which may be a reputation service. For example, should the file be from an entity with a good reputation, such as Microsoft®. Google® or the like, the reputation is "good", and the file backing P's process will not be obtained. The file paths obtained at blocks 514*a*-514*d* are then placed into a file list, at block 516.

From block 516, movement is to block 518, where application processes (processes) creating file paths in the aforementioned file list, that were not in the entry point, are pushed (sent) to the queue. Next, at block 520, process instances of files from the file list that were executed, that were not in the entry point, are pushed (sent) to the queue. Optionally, blocks 518 and 520 may be switched in their order.

The attack tree generating process moves to block 522, where the application process "P's" parent application processes (e.g., of the executed application processes) are pushed (sent) to the queue. Next, at block 524, the application process "P's" child application processes (e.g., of the executed application processes) are pushed (sent) to the queue.

Moving to block 526, the application process "P's" network operations are obtained, and malicious URLs and malicious IPs (malicious IP addresses), e.g., those URLs and IP addresses associated with malware or other suspicious processes are obtained. For example, the malicious (and or suspicious) URLs or Internet Protocol addresses (IPs) are moved to a URL/IP list, at block 528. The list is, for example, in storage media in the system 120'.

The attack tree generating process then moves to block 530, where all application processes which opened malicious (or suspicious) URLs or IPs (from the URL/IP list) are pushed to the queue. From block 530, the attack tree generating process moves to block 532, where application processes injecting the currently selected application process "P" are pushed (sent) to the queue. Next, at block 534, the application processes injected by the currently selected application process "P" are pushed (sent) to the queue.

From block 534, the attack tree generating process moves to block 536, where all operations and executions of P (for this iteration) are stored (e.g., in storage media). From block 536, the attack tree generating process returns to block 504, from where it resumes, in accordance with the description above.

Once all iterations of the attack tree generating process end, as the attack tree generating process ends at block 620, all application processes and files of the attack tree and their relationships to each other is all known. All output from the process 500 has been obtained and the attack tree, for example, similar to that shown in FIGS. 3B-1 and 3B-2 can be plotted, or otherwise illustrated, from the aforementioned output graphically.

Although an example order for the subprocesses of the attack tree generating process 500 is shown in FIGS. 5A and 5B and detailed above, the subprocesses of the attack tree generating process may be grouped as follows (with each group of blocks from FIGS. 5A and 5B in square brackets): [514, 516, 518, 520], [522], [524], [526, 528, 530], [532]. [534], [536]. The groups of blocks (subprocesses of the attack tree generating process) may then be performed in any order desired.

Attack Tree Generating Process—Example

Referring back to FIGS. 3A and 3B-2 an example of the attack tree determining process of FIGS. 5A and 5B is now described. Initially, from FIG. 3A, the attack root 300x is the application process malware.exe 305 of FIG. 3B-2. For purposes of this example, the processes malware.exe, random.exe, wp.exe and bad.exe are considered to be of unknown reputation.

The application process malware.exe 305 is the input application process of block 502. Next, at block 504, the queue, by definition, is not empty. Also, in this example, the queue contains only unique application processes, only a single occurrence of each application process is in the queue at any given time. At block 508, the application process malware.exe is popped from the queue, and this application process is not an OS/Compression/Network process at block 512. At blocks 514a1, 514a2, 514b and 514c, there are not any file paths for the file list. However, at block 514d, the process malware.exe is considered to be unknown, so the file path which goes into the file list, at block 516, is the file malware.exe. At block 518 and 520, nothing is added to the queue, since malware.exe was part of the entry point. Winzip.exe is excluded, because it is at the entry point, and malware.exe is excluded because it has already been processed and there are no other instances of malware.exe running in this example.

Next, at block 522, the parent application process explorer.exe is pushed into the queue, as is the child sdbinst.exe, at block 524. Blocks 526, 528, 530 are bypassed, as there are no malicious URLs or malicious IP addresses, and absent injections, blocks 532 and 534 are bypassed. The executions and operations of P are stored in storage media, at block 536, and the attack tree generating process then resumes from block 504, with the application processes (processes) explorer.exe and sdbinst.exe in the queue.

Explorer.exe is now popped from the queue, at block 508, and it has not yet been analyzed at block 510. However, once block 512 is reached, explorer.exe is an OS/compression/network process with all ancestor OS processes. Accordingly, the attack tree generating process returns to block 504, from where it resumes.

The application process sdbinst.exe is now popped from the queue, at block 508. It was not analyzed previously, as per block 510 and is not an OS/compression/network process with all ancestor OS processes, at block 512. Blocks 514 (514a1-514d) do not apply here, and blocks 516, 518 and 520 also do not apply here. At block 522, the parent process malware.exe is pushed into the queue and at block 524, the child process random.exe is pushed into the queue. Blocks 526, 528, 530, 532 and 534 are not applicable here, and at block 536, the executions and operations of P are stored in storage media. The attack tree generating process then resumes from block 504, with malware.exe and random.exe, as the processes in the queue.

The process malware.exe is popped from the queue at block 508. At block 510, the process malware.exe was analyzed, so the attack tree generating process returns to block 504. The application process random.exe remains in the queue.

From block 504, the attack tree generating process moves to block 508, where the application process random.exe is popped from the queue. This application process was not previously analyzed, at block 510, nor is it an OS/compression/network process with all ancestor OS processes, at block 512. Block 514, block 514a2 are applicable as files fake_report.pdf and wp.exe are obtained and placed into a file path list, at block 516. Block 518 does not result in an addition to the queue, since random.exe, the process creating the file paths in the file path list, is being analyzed by the attack tree generating process. At block 520, the application process wp.exe, which is a process instance of the file wp.exe, which was executed, is pushed into the queue. At block 522, the parent process sdbinst.exe is obtained and pushed to the queue, and at block 524, the child processes chrome.exe and wp.exe are obtained, with chrome.exe pushed to the queue. Wp.exe is not pushed to the queue, as it is already in the queue from block 520. Blocks 526, 528, 530 are bypassed, as there are no malicious URLs or malicious IN, and absent injections, blocks 532 and 534 are bypassed. The executions and operations of P are stored in storage media, at block 536. The attack tree generating process then resumes from block 504, with the application processes (processes) wp.exe, sdbinst.exe, and chrome.exe in the queue.

From block 504, and moving to block 508, the application process wp.exe is popped from the queue. This application process was not previously analyzed, at block 510, nor is it an OS/compression/network process with all ancestor OS processes, at block 512. The attack tree generating process then moves to block 514, where at block 514a2, the file paths for compchecker.exe and bad.exe are obtained, and placed on a file list, at block 516. At block 518, wp.exe is not pushed to the queue, since wp.exe, the process creating the files in the file list, is being analyzed by the attack tree generating process. At block 520, the application process bad.exe, which is a process instance of the file wp.exe, which was executed, is pushed into the queue. At block 522 the parent process random.exe is added to the queue. Block 524 is bypassed as there is not a child process of wp.exe.

Blocks 526, 528, 530 are bypassed, as there are no malicious URLs or malicious IP addresses, and absent injections, blocks 532 and 534 are bypassed. The executions and operations of P are stored in storage media, at block 536. The attack tree generating process then resumes from block 504, with the application processes sdbinst.exe, chrome.exe, bad.exe and random.exe in the queue.

Sdbinst.exe is now popped from the queue, at block 508, and once block 510 is reached, sdbinst.exe was previously analyzed. Accordingly, the attack tree generating process returns to block 504, from where it resumes, with chrome.exe, bad.exe and random.exe in the queue From block 504, chrome.exe is now popped from the queue, at block 508. This application process was not previously analyzed, at block 510, nor is it an OS/compression/network process with all ancestor OS processes, at block 512. The attack tree generating process then bypasses blocks 514a1, 514a2, 514b and 514c, as this is not a payload application process, there are not any file creations, not any file arguments and not any files from registry operations. Block 514d is not satisfied, as chrome.exe is a known process with a "good" reputation, as chrome is from Google® (as rated by a reputation service). At block 522, the parent process random.exe is not pushed into the queue as it already exists in the queue. Block 524 is not applicable, as there is not a child, but at block 526, the same malicious URL http//www.junkads.com is obtained and placed on a list, at block 528. At block 530, the process alpha.exe which opened the malicious URL http://www.junkads.com, is pushed into the queue. Absent injections, blocks 532 and 534 are bypassed. The executions and operations of P are stored in storage media, at block 536. The queue holds the application processes, bad.exe, random.exe, and alpha.exe. Only one instance of random.exe is in the queue. The attack tree generating process then resumes from block 504.

From block 504, the application process bad.exe is popped from the queue, at block 508. At block 510, this application process was not previously analyzed and it is not an OS/compression/Network process of block 512. Blocks 514-520 are not applicable, and at block 514d, the file paths associated with the file private_info.db was read and not created, such that block 514a2 is not satisfied. The URL http://www.exfiltration.com, attended to at blocks 526 and 528, does not have a process associated with it at block 530. The parent application process, from block 522, is explorer.exe (not shown), which is pushed into the queue All other blocks 524, 532, and 534 are not applicable. The executions and operations of P are stored in storage media, at block 536. The attack tree generating process resumes from block 504, with random.exe, alpha.exe and explorer.exe, in the queue.

From block 504, the application process random.exe is popped from the queue, at block 508. As this application process was previously analyzed at block 510, the attack tree generating process returns to block 504, with the application processes alpha.exe and explorer.exe in the queue.

From block 504, and moving to block 508, the application process alpha.exe is popped from the queue. At block 510, this application process was not previously analyzed and it is not an OS/compression/Network process of block 512. Blocks 514-520 are not applicable. At block 522, the parent process explorer.exe (a different instance thereof, based on ID and execution time, for example, and referred to herein as explorer.exe (second instance), is pushed to the queue. Blocks 524, 526, 528, 530, 532 and 534 and bypassed as they are not applicable. The executions and operations of P are stored in storage media, at block 536. With two instances of explorer.exe now in the queue (explor.exe and explorer.exe (second instance)), as the attack tree generating process resumes from block 504.

Moving from block 504 to block 508, explorer.exe is popped from the queue. At block 510, this application process was not previously analyzed, so the attack tree generating process moves to block 512. At block 512, explorer.exe is an OS process, the process returns to block 504. Explorer.exe (second instance) remains in the queue.

Moving from block 504 to block 508, explorer.exe (second instance) is popped from the queue. At block 510, this application process was not previously analyzed, so the attack tree generating process moves to block 512. At block 512, explorer.exe (second instance) is an OS process, the process returns to block 504.

The queue is now empty at block 504, so the attack tree generating process moves to block 506, where it ends.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a". "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of using a particular computer for generating a malware attack tree in response to a malware attack executed on a computerized endpoint, comprising:
using the particular computer to obtain an attack root for the computerized endpoint where the malware attack executed, the attack root comprising an attack root computer process executed by the computerized end point associated with the malware attack;
using the particular computer to analyze the attack root computer process to identify at least one application process to be added as part of the malware attack tree, and pushing the at least one application process to a queue in a computerized storage media for storing computer processes;

using the particular computer to pop a next application process from the queue, and analyzing the popped application process to identify at least one additional application process to be added as part of the malware attack tree, and pushing the at least one additional application process to the queue, wherein the at least one additional application process pushed to the queue includes: application processes that create files in a file list and that are not part of an entry point of the malware attack, and application process instances of files from the file list that were executed and that are not part of the entry point of the malware attack, the file list being created by obtaining file paths associated with the popped application process, and the entry point of the malware attack being traceable back from the attack root computer process through a sequence of computer processes associated with at least one of executions, creations, or injections;

using the particular computer to repeat the popping the next application process from the queue until the queue is empty; and the particular computer outputting the attack root computer process, the at least one application process, the at least one additional application process, and relationships between the at least one application process and the at least one additional application process to the attack root, in order to build the malware attack tree, wherein the attack root computer process and the application processes are instances of computer programs executed on the computerized endpoint.

2. The method of claim 1, wherein the at least one additional application process pushed to the queue further includes application processes that opened a malicious Uniform Resource Locator (URL) or Internet Protocol (IP) address associated with network operations of the popped application process.

3. The method of claim 1, wherein the at least one additional application process pushed to the queue further includes application processes that injected the popped application process.

4. The method of claim 1, wherein the at least one additional application process pushed to the queue further includes application processes that were injected by the popped application process.

5. The method of claim 1, wherein obtaining the file paths associated with the popped application process includes looking for at least one of: files created by the popped application process, files renamed by the popped application process, files written to the popped application process, or files read by the popped application process.

6. The method of claim 1, wherein obtaining the file paths associated with the popped application process includes obtaining file arguments of the popped application process.

7. The method of claim 1, wherein obtaining the file paths associated with the popped application process includes obtaining registry operations of the popped application process.

8. The method of claim 1, wherein obtaining the file paths associated with the popped application process includes obtaining a file path backing the popped application process if the popped application process is determined to be at least one of an unknown computer process or a malicious computer process.

9. The method of claim 8, further comprising: using the particular computer to determine, based on a reputation of the file path, if the popped application process is an unknown computer process or a malicious computer process.

10. The method of claim 1, further comprising: using the particular computer to push a parent application process of the at least one additional application process to the queue.

11. The method of claim 1, further comprising: using the particular computer to push child application processes of the at least one additional application process to the queue.

12. A computer system for generating a malware attack tree in response to a malware attack executed on a computerized endpoint, comprising:

at least one computerized storage media having a queue that maintains computer processes;

a non-transitory computer readable storage medium for storing computer components; and a hardware processor for executing the computer components comprising:

a computer module configured for:

obtaining an attack root for the computerized endpoint where the malware attack executed, the attack root comprising an attack root computer process executed by the computerized end point associated with the malware attack, analyzing the attack root computer process to identify at least one application process to be added as part of the malware attack tree, and pushing the at least one application process to the queue, popping a next application process from the queue, and analyzing the popped application process to identify at least one additional application process to be added as part of the malware attack tree, and pushing the at least one additional application process to the queue, wherein the at least one additional application process pushed to the queue includes: application processes that create files in a file list and that are not part of an entry point of the malware attack, and application process instances of files from the file list that were executed and that are not part of the entry point of the malware attack, the file list being created by obtaining file paths associated with the popped application process, and the entry point of the malware attack being traceable back from the attack root computer process through a sequence of computer processes associated with at least one of executions, creations, or injections, repeating the popping the next application process from the queue until the queue is empty, and outputting the attack root computer process, the at least one application process, the at least one additional application process, and relationships between the at least one application process and the at least one additional application process to the attack root, in order to build the malware attack tree, wherein the attack root computer process and the application processes are instances of computer programs executed on the computerized endpoint.

13. The computer system of claim 12, wherein the at least one additional application process pushed to the queue further includes application processes that opened a malicious Uniform Resource Locator (URL) or Internet Protocol (IP) address associated with network operations of the popped application process.

14. The computer system of claim 12, wherein the at least one additional application process pushed to the queue further includes application processes that injected the popped application process.

15. The computer system of claim 12, wherein the at least one additional application process pushed to the queue further includes application processes that were injected by the popped application process.

16. The computer system of claim 12, wherein the computer module is further configured for: obtaining the file paths associated with the popped application process by looking for at least one of: files created by the popped application process, files renamed by the popped application process, files written to the popped application process, or files read by the popped application process.

17. The computer system of claim 12, wherein the computer module is further configured for: obtaining the file paths associated with the popped application process by performing at least one of: i) obtaining file arguments of the popped application process, ii) obtaining registry operations of the popped application process, or iii) obtaining a file path backing the popped application process if the popped application process is determined to be at least one of an unknown computer process or a malicious computer process.

18. The computer system of claim 12, wherein the computer module is further configured for: pushing a parent application process of the at least one additional application process to the queue.

19. The computer system of claim 12, wherein the computer module is further configured for: pushing child application processes of the at least one additional application process to the queue.

20. A computer usable non-transitory storage medium having a computer program embodied thereon for causing a suitably programmed system to generate a malware attack tree in response to a malware attack executed on a computerized endpoint, by performing the following steps when such program is executed on the system, the steps comprising:

obtaining an attack root for the computerized endpoint where the malware attack executed, the attack root comprising an attack root computer process executed by the computerized end point associated with the malware attack;

analyzing the attack root computer process to identify at least one application process to be added as part of the malware attack tree, and pushing the at least one application process to the queue;

popping a next application process from the queue, and analyzing the popped application process to identify at least one additional application process to be added as part of the malware attack tree, and pushing the at least one additional application process to the queue, wherein the at least one additional application process pushed to the queue includes: application processes that create files in a file list and that are not part of an entry point of the malware attack, and application process instances of files from the file list that were executed and that are not part of the entry point of the malware attack, the file list being created by obtaining file paths associated with the popped application process, and the entry point of the malware attack being traceable back from the attack root computer process through a sequence of computer processes associated with at least one of executions, creations, or injections;

repeat the popping the next application process from the queue until the queue is empty; and outputting the attack root computer process, the at least one application process, the at least one additional application process, and relationships between the at least one application process and the at least one additional application process to the attack root, in order to build the malware attack tree, wherein the attack root computer process and the application processes are instances of computer programs executed on the computerized endpoint.

* * * * *